US007633988B2

(12) United States Patent
Fish et al.

(10) Patent No.: US 7,633,988 B2
(45) Date of Patent: Dec. 15, 2009

(54) TUNABLE LASER SOURCE WITH MONOLITHICALLY INTEGRATED INTERFEROMETRIC OPTICAL MODULATOR

(75) Inventors: Gregory A. Fish, Santa Barbara, CA (US); Yuliya Akulova, Goleta, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 520 days.

(21) Appl. No.: 10/909,188

(22) Filed: Jul. 30, 2004

(65) Prior Publication Data

US 2005/0025419 A1 Feb. 3, 2005

Related U.S. Application Data

(60) Provisional application No. 60/491,587, filed on Jul. 31, 2003.

(51) Int. Cl.
*H01S 5/00* (2006.01)

(52) U.S. Cl. ............... 372/50.22; 372/50.1; 372/50.11; 372/20

(58) Field of Classification Search ............... 372/50.1, 372/50.11, 50.22, 20
See application file for complete search history.

(56) References Cited

U.S. PATENT DOCUMENTS

| 4,896,325 | A |   | 1/1990  | Coldren |            |
|-----------|---|---|---------|---------|------------|
| 5,043,996 | A | * | 8/1991  | Nilsson et al. | ............ 372/94 |
| 5,303,079 | A |   | 4/1994  | Gnauck et al. | |
| 5,315,422 | A | * | 5/1994  | Utaka et al. | ............ 359/107 |
| 5,652,807 | A |   | 7/1997  | Fukuchi | |
| 5,694,504 | A |   | 12/1997 | Yu et al. | |
| 5,778,113 | A |   | 7/1998  | Yu | |
| 6,334,005 | B1 |   | 12/2001 | Burie et al. | |
| 6,349,106 | B1 | * | 2/2002  | Coldren | ............ 372/50.1 |
| 6,516,017 | B1 |   | 2/2003  | Matsumoto | |
| 6,574,259 | B1 |   | 6/2003  | Fish et al. | |
| 6,587,604 | B2 |   | 7/2003  | Yamauchi | |
| 6,614,213 | B1 | * | 9/2003  | Whitebread et al. | ............ 324/72 |
| 6,795,594 | B2 | * | 9/2004  | Betty | ............ 385/3 |
| 6,882,758 | B2 |   | 4/2005  | Betty | ............ 385/9 |
| 2004/0174915 | A1 | * | 9/2004 | Sarlet et al. | ............ 372/20 |

OTHER PUBLICATIONS

Zucker, J.E.; Monolithically integrated laser/Mach-Zehnder modulators using quantum wells, Lasers and Electro-Optics Society Annual Meeting, 1993. LEOS '93 Conference Proceedings. IEEE, Nov. 15-18, 1993, pp. 641-642.

(Continued)

*Primary Examiner*—Minsun Harvey
*Assistant Examiner*—Kinam Park
(74) *Attorney, Agent, or Firm*—Matthew A. Pequignot; Pequignot + Myers LLC

(57) ABSTRACT

A monolithically-integrated semiconductor optical transmitter that can index tune to any transmission wavelength in a given range, wherein the range is larger than that achievable by the maximum refractive index tuning allowed by the semiconductor material itself (i.e. $\Delta\lambda/\lambda > \Delta n/n$). In practice, this tuning range is >15 nm. The transmitter includes a Mach-Zehnder (MZ) modulator monolithically integrated with a widely tunable laser and a semiconductor optical amplifier (SOA). By using an interferometric modulation, the transmitter can dynamically control the chirp in the resulting modulated signal over the wide tuning range of the laser.

47 Claims, 6 Drawing Sheets

OTHER PUBLICATIONS

Zucker, J.E.; Jones, K.L.; Newkirk, M.A.; Gnall, R.P.; Miller, B.I.; Young, M.G.; Koren, U.; Burrus, C.A.; Tell, B.; Quantum well interferometric modulator monolithically integrated with 1.55 μm tunable distributed Bragg reflector laser, Electronics Letters, vol. 28 Issue: 20, Sep. 24, 1992, pp. 1888-1889.

Rolland, C.; InGaAsP-based Mach-Zehnder modulators for high-speed transmission systems, Optical Fiber Communication Conference and Exhibit, 1998. OFC '98., Technical Digest, Feb. 22-27, 1998, pp. 283-284.

Alculova, Y.A.; Fish, G.A.; Ping-Chiek Koh; Schow, C.L.; Kozodoy, P.; Dahl, A.P.; Nakagawa, S.; Larson, M.C.; Mack, M.P.; Strand, T.A.; Coldren, C.W.; Hegblom, E.; Penniman, S.K.; Wipiejewski, T.; Coldren, L.A.; Widely tunable electroabsorption-modulated sampled-grating DBR laser transmitter, Selected Topics in Quantum Electronics, IEEE Journal on, vol. 8 Issue: 6, Nov.-Dec. 2002, pp. 1349-1357.

Yu, J.; Rolland, C.; Yevick, D.; Somani, A.; Bradshaw, S.; Phase-engineered III-V MQW Mach-Zehnder modulators, Photonics Technology Letters, IEEE, vol. 8 Issue: 8, Aug. 1996, pp. 1018-1020.

Penninckx, D.; Delansay, Ph.; Comparison of the propagation performance over standard dispersive fiber between InP-based π-phase-shifted and symmetrical Mach-Zehnder modulators, Photonics Technology Letters, IEEE, vol. 9 Issue: 9, Sep. 1997, pp. 1250-1252.

Lovisa, S.; Bouche, N.; Helmers, H.; Heymes, Y.; Brillouet, F.; Gottesman, Y.; Rao, K.; Integrated laser Mach-Zehnder modulator on indium phosphide free of modulated-feedback, Photonics Technology Letters, IEEE, vol. 13 Issue: 12, Dec. 2001, pp. 1295-1297.

Xun Li; Huang, W.-P.; Adams, D.M.; Rolland, C.; Makino, T.; Modeling and design of a DFB laser integrated with a Mach-Zehnder modulator, Quantum Electronics, IEEE Journal of, vol. 34 Issue: 10, Oct. 1998, pp. 1807-1815.

Lawetz, C.; Cartledge, J.C.; Rolland, C.; Yu, J.; Modulation characteristics of semiconductor Mach-Zehnder optical modulators, Lightwave Technology, Journal of, vol. 15 Issue: 4, Apr. 1997, pp. 697-703.

Hoon Kim; Gnauck, A.H.; Chirp characteristics of dual-drive. Mach-Zehnder modulator with a finite DC extinction ratio, Photonics Technology Letters, IEEE, vol. 14 Issue: 3, Mar. 2002, pp. 298-300.

Anderson, K.; Betty, I.; Indium Phosphide MZ chips are suited to long-reach metro, Laser Focus World, vol. 39 Issue: 3, Mar. 2003, pp. 101-104.

Muller, M.; Gollub, D.; Fischer, M.; Kamp, M.; Forchel, A.; 1.3-/spl mu/m continuously tunable distributed feedback laser with constant power output based on GaInNAs-GaAs, Photonics Technology Letters, IEEE, vol. 15 Issue: 7, Jul. 2003, pp. 897-899.

Reid, D.C.J.; Robbins, D.J.; Ward, A.J.; Whitbread, N.D.; Williams; P.J.; Busico, G.; Carter, A.C.; Wood, A.K.; Carr, N.; Asplin, J.C.; Kearley, M.Q.; Hunt, W.J.; Brambley, D.R.; Rawsthome, J.R.; A novel broadband DBR laser for DWDM networks with simplified quasi-digital wavelength selection, Optical Fiber Communication Conference and Exhibit, 2002. OFC 2002, Mar. 17-22, 2002, pp. 541-543.

* cited by examiner

TUNABLE LASER SOURCE WITH MONOLITHICALLY INTEGRATED INTERFEROMETRIC OPTICAL MODULATOR

CROSS-REFERENCE TO RELATED APPLICATIONS

This application claims the benefit under 35 U.S.C. §119 (e) of co-pending and commonly-assigned U.S. provisional patent application Ser. No. 60/491,587, filed Jul. 31, 2003, by Gregory A. Fish and Yuliya Akulova, and entitled "TUNABLE LASER SOURCE WITH MONOLITHICALLY INTEGRATED INTERFEROMETRIC OPTICAL MODULATOR," which application is incorporated by reference herein.

BACKGROUND OF THE INVENTION

1. Field of the Invention

This invention relates generally to laser assemblies, and more particularly to a widely tunable laser assembly with an integrated optical modulator.

2. Description of the Related Art (Note: This application references a number of different patents and/or publications as indicated throughout the specification by reference numbers enclosed in brackets, e.g., [x]. A list of these different patents and/or publications ordered according to these reference numbers can be found below in the section entitled "References." Each of these patents and/or publications is incorporated by reference herein.)

A compact, high-performance widely-tunable integrated laser/modulator chip would be a key component of a tunable transmitter that can dramatically lower the barriers to deployment and operation of high capacity, dense-wavelength division-multiplexing (DWDM) networks. Traditional non-tunable implementations of DWDM transmitters have discouraged the integration of laser source and modulator because of the high cost of these individual components combined with the fact that separate part numbers for each wavelength and its spare would have to be inventoried. Several implementations of such co-packaged transmitters exist for 10 Gb/s transmission in which the laser and modulator are fabricated on separate chips and coupled together by microoptics. Given systems employing as many as 100 or more wavelengths, this model has contributed to the mountains of inventory associated with the current telecom build-out. However, a widely-tunable laser with full band coverage would resolve this problem by using a single part for all channels with minimal spares, and would give an economic impetus for the further integration of source and modulator into one hermetic package.

The present invention describes an approach wherein a laser and modulator are fabricated by monolithic integration on a single indium phosphide (InP) chip. The laser is a widely-tunable Sampled Grating Distributed Bragg Reflector (SG-DBR) laser that is made possible by an InP-based technology platform that can integrate active waveguide, passive waveguide, and grating reflector sections, all of which can be tuned by current injection.

The modulator is a Mach-Zehnder (MZ) modulator, which is the structure of choice for long-reach transmission systems of 10 Gb/s or more because of its favorable chirp and extinction characteristics. The MZ modulator includes two curved waveguides whose relative optical phase length can be adjusted at high speed with a modulation voltage through the electro-optic effect, and two multimode interference (MMI) couplers that successively split the incoming light into two paths and then constructively or destructively combine the light on the output depending on the modulated phase difference. As a discrete component, the MZ modulator is typically fabricated on lithium niobate ($LiNbO_3$) or gallium arsenide (GaAs) substrates with device lengths of several centimeters, thus requiring the use of a traveling-wave electrode geometry to overcome capacitance limitations.

A monolithically integrated laser and modulator presents a number of opportunities. Lower voltage and smaller modulator size through the use of the quadratic electro-optic effect in InP allow for a compact chip (4×0.5 $mm^2$) and package (30×10 $mm^2$), as well as lower power dissipation in the modulator. Low coupling loss between laser and modulator calls for reduced laser launch power and hence lower power dissipation in the laser.

Additional benefits of the InP integration platform include modulator chirp control through tuning current injection, additional amplification stages for higher power output, as well as integrated tap photodiodes for modulator bias control. Furthermore, the developed technology can be used to supply enabling building blocks to provide additional functionality including alternative data encoding formats and modulation techniques which will become necessary for next generation systems due to the combination of high bit rates and small channel spacing.

Several embodiments of InP MZ modulators with and without integrated lasers have been disclosed in the literature [1,2,3]. For example, the prior art has disclosed a tunable laser with an integrated MZ modulator [1,2]; however, the tuning range was limited by the laser design to the amount of index shift achievable in InP materials and in practice to <2.5 nm. Additional prior art has been disclosed on the integration of widely tunable lasers with electro-absorptive modulators [4,14]; however, this structure has limited dispersion tolerance due to positive chirp inherent in the bulk Franz-Keldysh modulator used for operation over the wide wavelength tuning range of the laser. Other art has integrated multiple smaller tuning range lasers with a single modulator to cover a wider wavelength range [21]; however, this approach suffers an inherent loss due to the need to couple the multiple lasers into single input, and the additional issues relating to temperature change in the modulator when tuning the individual lasers to the desired frequency.

The present invention improves upon the prior art by integrating a single laser where the tuning range is larger than what is achievable through index change (in practice >40 nm) with an interferometric modulator whose chirp can be optimized and controlled over such a wide wavelength range.

Conventional InP MZ modulators suffer from additional attenuation when voltage is applied for the necessary phase shift. This problem degrades the extinction ratio and prevents negative chirp in conventional InP modulators. The prior art has disclosed inserting a π (i.e. 180°) phase shift between the arms and changing the splitting ratio of the input and output splitters in the MZ modulator to allow for simultaneous high extinction and negative chirp [5,6,7,17]. Additional prior art has disclosed the use of additional voltage electrodes to change the value of this phase shift after fabrication [8,17]. These approaches in the prior art have deficiencies in that the range of differential phase shift between the arms (without any bias applied) must be tightly controlled in the device and deviations in fabrication, over temperature and over life need to be compensated with voltage, inducing additional undesirable loss and extinction ratio changes.

The present invention improves upon the prior art by using electrodes that inject current to adjust the phase shift between the arms to any value that is desired. The present invention allows 10× less loss for a given phase shift allowing for a larger range of phase shifts to be achieved without degrading the extinction ratio due to loss imbalance. This improvement creates a MZ modulator that has characteristics much more similar to LiNbO$_3$ or GaAs modulators in that the devices can be operated with any built-in differential phase shift between the arms, and not necessarily 180 degrees as stated in the prior art [5,17].

One of the serious issues in the prior art with integrating a laser monolithically with a MZ modulator is that the modulator designs shown in the prior art reflect light differently between the on and off state of the modulator [9,10]. This reflection slightly perturbs the lasing wavelength of the on-chip laser imparting additional chirp on the modulated light signal and degrading fiber optic transmission.

The present invention overcomes this limitation by using a 2×2 multimode interference (MMI) coupler acting as a combiner in the output of the MZ modulator. This improvement causes the on and off state of the modulator to have the same reflectivity which does not impart any frequency chirp due to the laser.

SUMMARY OF THE INVENTION

It is the object of this invention to provide a monolithically-integrated, widely-tunable, semiconductor optical transmitter that can index tune to any transmission wavelength in a given range, wherein the range is larger than that achievable by the maximum refractive index tuning allowed by the semiconductor material itself (i.e. $\Delta\lambda/\lambda > \Delta n/n$). In practice, this tuning range is >15 nm. Furthermore, the transmitter contains a Mach-Zehnder (MZ) modulator monolithically integrated with the widely tunable laser and a semiconductor optical amplifier (SOA). By using an interferometric modulation, the transmitter can dynamically control the chirp in the resulting modulated signal over the wide tuning range of the laser.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
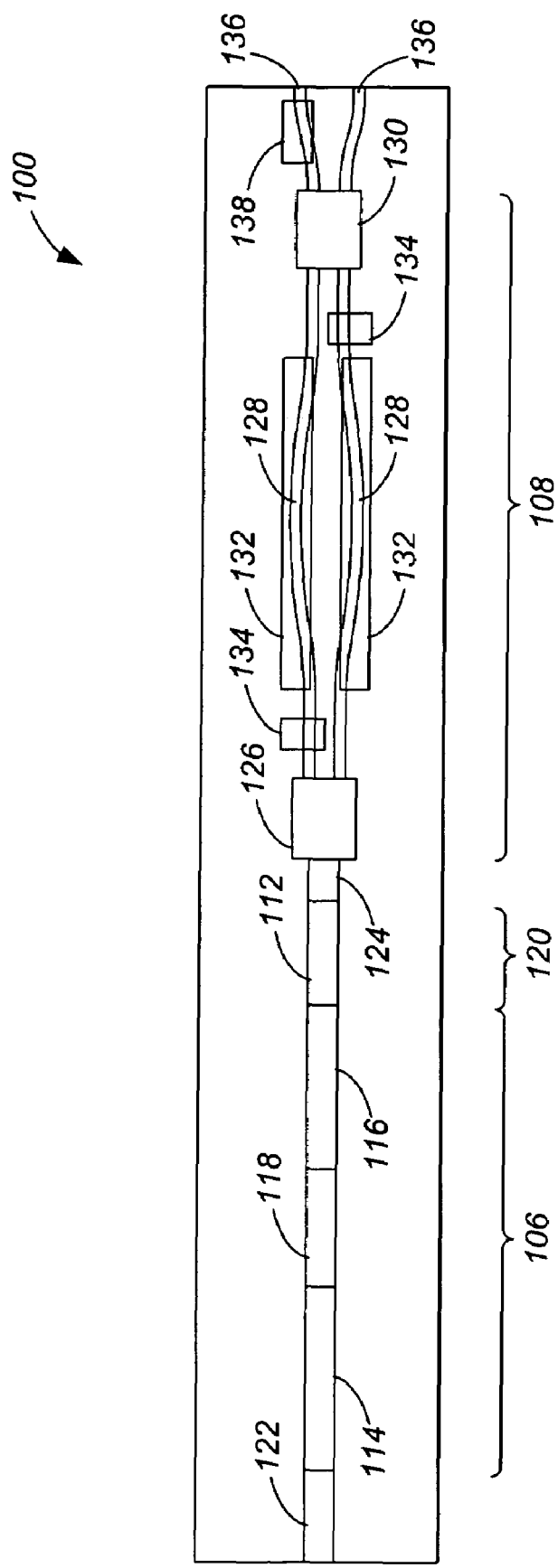
FIG. 1 is a top view that schematically illustrates a monolithically integrated device comprising a diode laser assembly according to one embodiment of the present invention.
Figure 2:
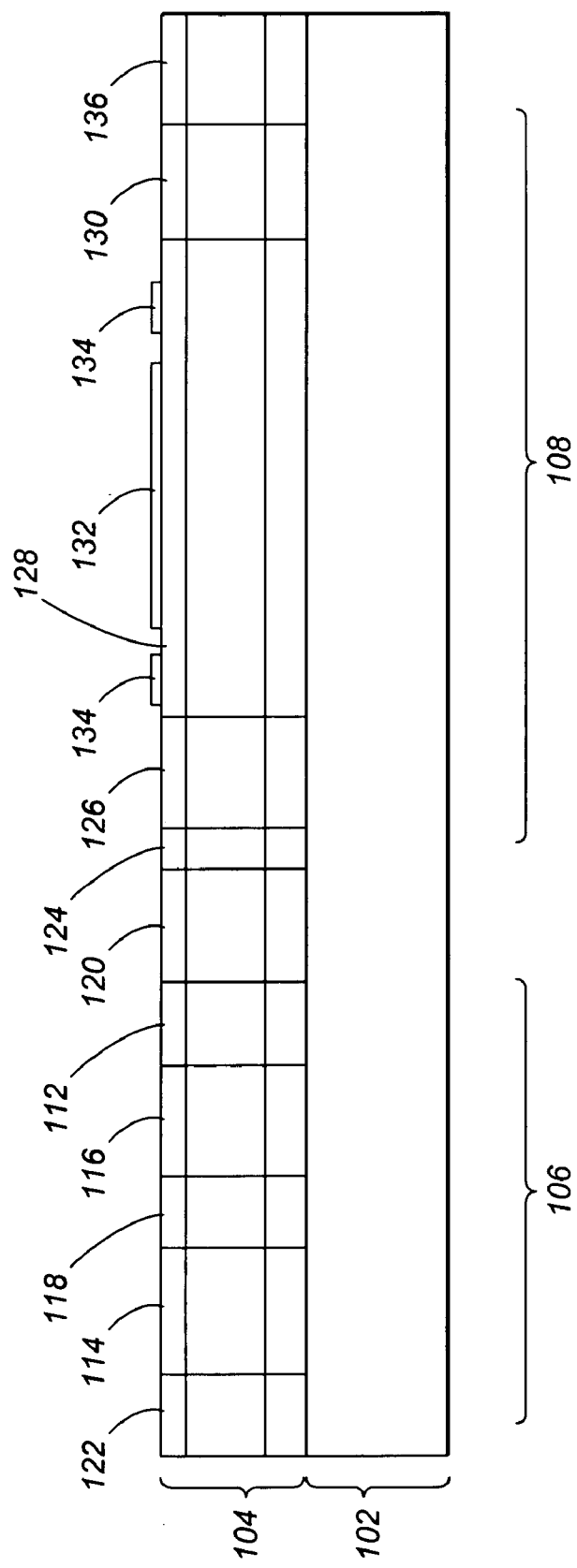
FIG. 2 is a cross-sectional side view that schematically illustrates a monolithically integrated device comprising a diode laser assembly according to one embodiment of the present invention.

FIGS. 1 and 2 are views that schematically illustrate a monolithically-integrated, semiconductor optical transmitter device 100 according to one embodiment of the present invention. FIG. 2 is a cross-sectional side view of the device 100, and FIG. 1 is a top view of the device 100.

The device 100 is comprised of a common substrate 102 (which may comprise InP); at least one epitaxial structure 104 (which may comprise varying layers of InP, InGaAsP, InGaAs, InGaAsP, etc.) formed on the common substrate 102; a widely-tunable sampled grating distributed Bragg reflector (SGDBR) laser resonator 106, formed on the common substrate in the epitaxial structure 104, for producing a light beam; and a semiconductor Mach-Zehnder (MZ) modulator 108, formed on the common substrate 102 in the same or different epitaxial structure 104 as the laser 106, for modulating the light beam, wherein the MZ modulator 108 is positioned external to the laser 106, but along a common waveguide 110 with the laser. Preferably, a wavelength tuning range of the laser 106 is wider than what is achievable through an index change and a chirp of the modulated light beam is dynamically controlled by the MZ modulator 108 over the wider wavelength tuning range of the laser 106.

The laser 106 preferably is comprised of a front mirror or reflector 112, a back mirror or reflector 114, a gain section 116 positioned between the front and back mirrors 112, 114 or incorporated within the mirrors 112, 114, and a phase section 118, all of which are situated along the common waveguide 110. By applying an appropriate combination of currents to 112, 114, 116 and 118, a light beam is produced by the laser 106, wherein any frequency of the light beam within the designed tuning range can be emitted from the laser 106. In this embodiment, the wavelength of the light beam is tunable over a wider wavelength range than is achievable by index tuning of any one section 112, 114, 116 and 118, and the wider wavelength range is represented by $\Delta\lambda/\lambda > \Delta n/n$, wherein $\lambda$ represents the wavelength of the light beam, $\Delta\lambda$ represents the change (or delta) in the wavelength of the light beam, n represents the index tuning of the laser 106, and $\Delta n$ represents the change (or delta) in the index tuning of the laser 106.

To simplify operation and decouple power control from the wavelength tuning, a semiconductor optical amplifier (SOA) 120 is situated after the laser 106 and before the MZ modulator 108, wherein the SOA 120 amplifies the light beam produced by the laser 106. The SOA 120 is formed on the common substrate 102 in the same or different epitaxial structure 104 as the laser 106 and/or MZ modulator 108.

The device 100 also includes a back facet monitor 122 positioned adjacent the back mirror 114 and a front tap 124 positioned between the SOA 120 and MZ modulator 108.

Other embodiments of widely tunable lasers are known to those skilled in the art [19,20] and, in general, they can be classified as having more than one independently controlled section wherein the output wavelength of the laser is tunable over a wider wavelength range than is achievable by index tuning in any one section, and the wider wavelength range is represented by $\Delta\lambda/\lambda > \Delta n/n$.

Preferably, the MZ modulator 108 (also known as an MZ interferometer or MZI) is comprised of a first 1×2 (or N×2) multimode interference (MMI) coupler 126 that splits (equally or unequally) the light generated from the laser 106 and amplified by the SOA 120 into first and second components of equal or unequal magnitude that are directed by first and second interferometric arms 128 of an optical waveguide, respectively, to two inputs of a second 2×2 (or 2×N) MMI coupler 130 that combines (equally or unequally) the first and second components interferometrically, thereby directing the combined components to one of the output waveguides of the coupler 130, wherein the optical path length difference of the arms 128 determines into which output of the second MMI coupler 130 to direct the combined components.

Both arms 128 comprise curved waveguides, and each of the arms 128 contain a first electrode 132 for applying an electric field to modulate the light beam, and at least one of the arms 128 contains a second electrode 134 for applying a current to adjust a phase of the light beam. Specifically, the electrodes 132 accept a modulation voltage to adjust a relative optical phase length of the arm 128 at high speed through an electro-optic effect, while the electrodes 134 permit a free selection of a differential phase shift between the interferometric arms 128 with minimal attenuation. The first MMI coupler 126 successively splits the light beam into separate paths for the arms 128 and the second MMI coupler 130 then constructively or destructively combines the light beams from the arms, depending on their modulated phase difference, into an output.

The MMI couplers 126 and 130 are designed to prevent reflection of light beam back into the laser 106 cavity by ensuring that the input/output faces of the MMI couplers 126 and 130 form an obtuse angle with the sides of the input/output waveguides 110. Further, the second MMI coupler 130 has two outputs such that a residual reflectivity is the same when the light beam is directed toward either of the outputs, which ensures that the laser 106 is not perturbed differently as the MZ modulator 108 switches the light between the paths under modulation.

Following the 2×2 MMI coupler 130, two output couplers 136 are formed on the common substrate 102 in the same or different epitaxial structure 104, wherein at least one of the output couplers 136 is positioned and configured to receive the light beam output from the MZ modulator 108, and couple the light beam output from the MZ modulator 108 to a following optical assembly (not shown).

These output couplers 136 reduce back reflections to the MZ modulator 108. In addition, the output couplers 136 may be used to transform a shape of an optical mode of the light beam at the output of the MZ modulator 108 to a substantially circular pattern to produce a symmetric farfield pattern, as opposed to a conventional elliptical pattern typical of semiconductor waveguides. In general, the farfield should be modified to match the requirements of the optical assembly used to couple the light beam into an optical fiber and is not necessarily limited to circular patterns.

Figure 3:
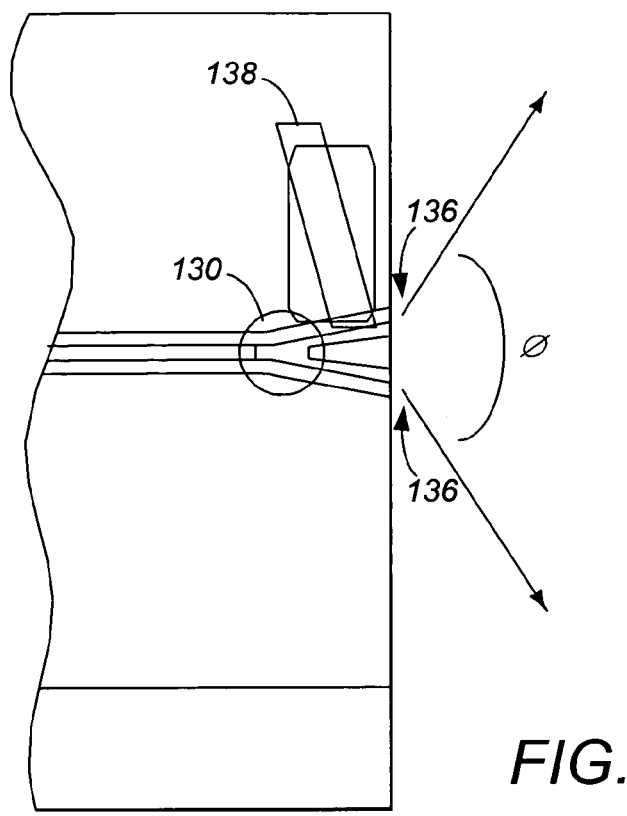
FIG. 3 is a is a top view that schematically illustrates output couplers that are curved to prevent intersecting a facet of the device perpendicularly.

FIG. 3 is a top view that schematically illustrates the output couplers 136 according to an embodiment of the present invention. When the MZ modulator 108 is in an "on" state, the light beam exits through the lower or first of the output couplers 136, and when the MZ modulator 108 is in an "off" state, the light beam exits through the upper or second of the output couplers 136.

Both of the output couplers 136 are curved to prevent the light beam exiting from a facet of the device 100 in a direction that is perpendicular to the facet. In addition, the paths of the output couplers 136 preferably are at an angle relative to each other. Consequently, the respective light beams generated during the "on" state and "off" state of the MZ modulator 102 propagate at an angle $\phi$ relative to each other that is greater than 20 degrees from each other after exiting the device 100.

Figure 4:
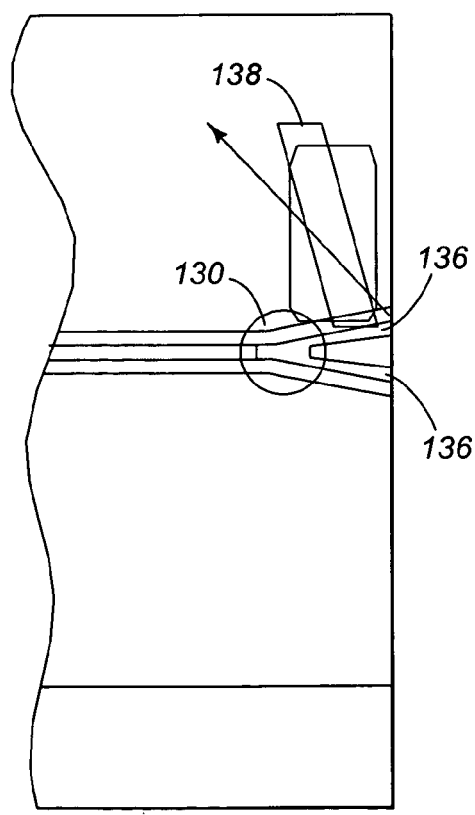
FIG. 4 is a is a top view that schematically illustrates output couplers that reflect light from the modulator into a power tap.

The device 100 also includes an electrode 138 that monitors an optical power of the light beam output from the MZ modulator 108, through the collection of photocurrent, wherein the electrode is positioned to receive the light beam from the second output coupler 136. The electrode 138 can be positioned to receive the light beam before it reaches the facet, as shown in FIGS. 1, 2 and 3, or it can be positioned to receive the light beam reflecting from the facet, as depicted in FIG. 4. In FIG. 4, the angle between the direction of propagation along the second output coupler 136 and the facet of the device may be made greater than a critical angle to induce a total internal reflection of the light beam.

The prior art has disclosed an arrangement absorb the light from the output of the modulator [18]; however, the present invention is intended to convert all of the modulated light to photocurrent and is not suitable for applications where the light output of a MZ modulator will be coupled to an optical assembly separate from the integrated device. Furthermore, the prior art uses a 2×1 combiner, necessitating a complex scheme for coupling the light to the tap detector. The use of a 2×2 MMI coupler 130 in the present invention allows for the substantially simpler embodiments.

The high efficient nature of current induced phase tuning can be used to create additional enhancements to the monolithically integrated tunable transmitter. The prior art has discussed that the chirp of semiconductor modulators can be adjusted by changing the splitting ratio of the splitters used in an MZ modulator [11] or by modifying the RF drive applied to a dual drive MZI [12,13]. The prior art has also disclosed the use of control electrodes to modify the chirp of the modulated waveform by applying DC voltage to the control electrodes contained in the arms [8], but this approach has a limited ability to change the chirp and can adversely effect the modulator extinction ratio due to imparting a loss imbalance in the arms. Additional prior art has disclosed the addition of an electrode to modify the splitting ratio to increase the extinction ratio of the modulator [16], but has not discussed modifying the splitting ratio of the combiner or discussed the possibility of tuning the chirp.

Figure 5:
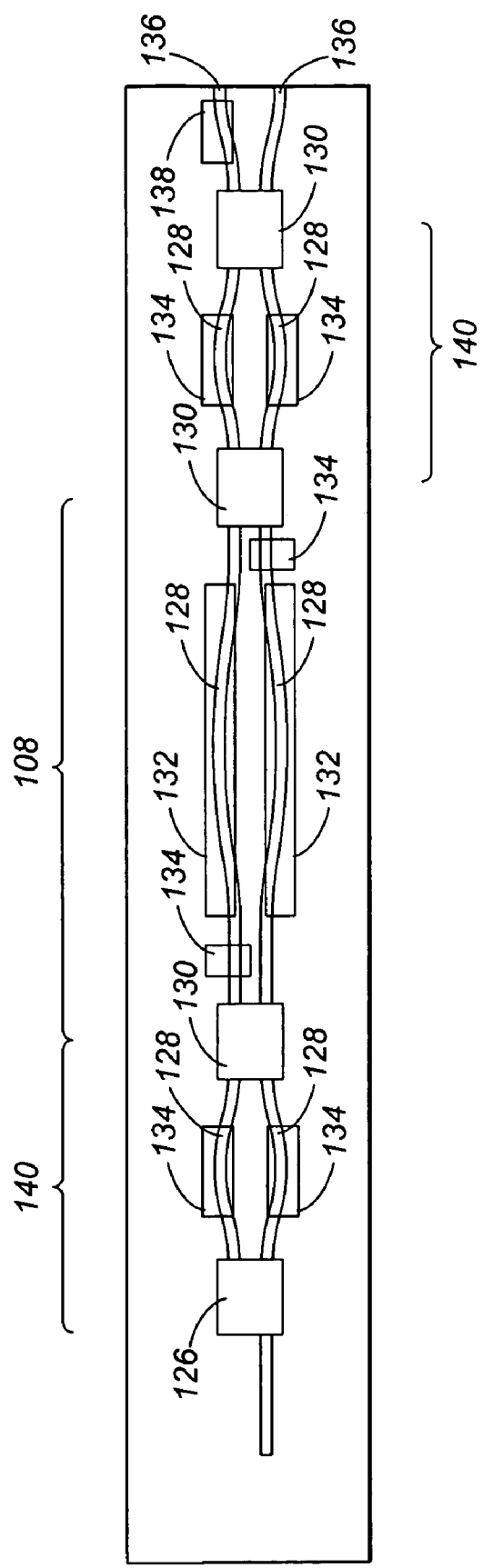
FIG. 5 is a top view that schematically illustrates modulators acting as a variable optical attenuator (VOA), wherein a splitting ratio can be modified by injecting current into control electrodes.

FIG. 5 illustrates another embodiment of the present invention wherein one or more additional short MZ modulators 140, which act as variable splitters or combiners, are positioned before and/or after the MZ modulator 108. The additional short MZ modulators 140, which are formed on the common substrate 102 in the epitaxial structure 104, modify chirp properties of the MZ modulator 108. The splitting and/or combining ratio of the additional short MZ modulators 140 can be modified by injecting current into their electrodes 134 to dynamically control the chirp properties of the MZ modulator 108 without adjusting the modulation voltage applied to the electrodes 132 in either arm 128.

The use of electrodes 134 as current-induced phase shifters in the splitting/combining MZ modulators 140 makes this practical, as they do not significantly lengthen the device 100 (<500 um) or add substantial insertion loss (<2 dB). Further, the insertion loss would remain relatively constant for a range of splitting ratios around the nominal unbiased value due to the low increase in loss incurred by using current induced index change. Voltage-based electrodes 132 performing this function would be impractical due to the high additional loss (>6 dB), large size (>1 mm) and large variation in insertion loss as the splitting ratio changes.

Figure 6:
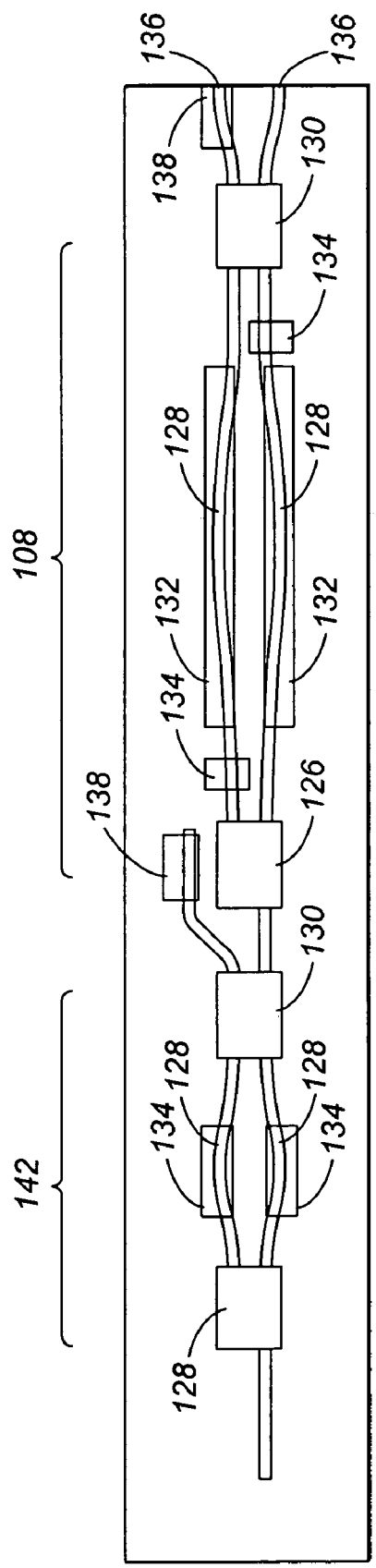
FIGS. 6 and 7 are top views that schematically illustrate modulators acting as a splitter/combiner, wherein a splitting ratio can be modified by injecting current into control electrodes.
Figure 7:
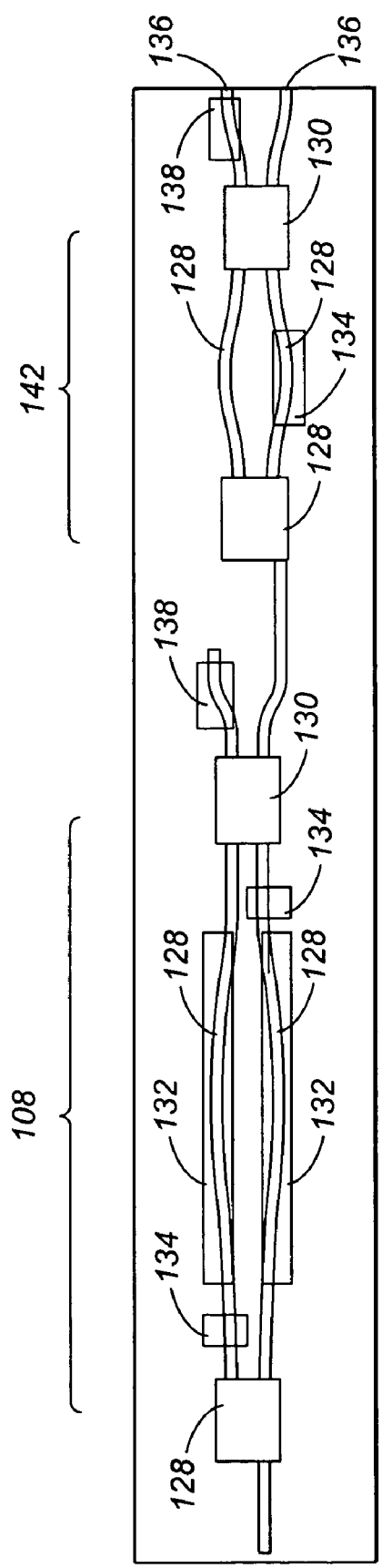

FIGS. 6 and 7 illustrate another embodiment of the present invention, wherein the device 100 power is adjusted over a large dynamic range. This is desirable feature can be obtained by adding one or more additional short MZ modulators 142, which are formed on the common substrate 102 in the epitaxial structure 104, to the monolithically integrated device 100. In this embodiment, each of the additional short MZ modulators 142 functions as a variable optical attenuator (VOA). FIG. 6 illustrates an embodiment wherein the additional short MZ modulator 142 is positioned before the MZ modulator 108, while FIG. 7 illustrates an embodiment wherein the additional short MZ modulator 142 is positioned after the MZ modulator 108.

The prior art has disclosed the addition of an absorptive VOA prior to a modulator [15]; however, there are several deficiencies with the prior art approach. First, the power dissipation of this approach scales dramatically with the input power to be attenuated and the degree of attenuation (5-10 times the input optical power) necessitating designs that are multi-section to avoid catastrophic damage due to heating. These multi-section designs add substantial length to the modulator (over a factor of 2 as compared to a modulator alone).

FIGS. 6 and 7, on the other hand, illustrate configurations where the VOA is created using a short interferometric optical attenuator, i.e., the additional short MZ modulator 142, controlled by current injection via electrodes 134. The advantage of this embodiment is that it adds only <500 um to the length (less than 30% increase) and the power dissipation is limited to <20 mW regardless of the optical input power.

REFERENCES

The following references are incorporated by reference herein:

[1] Zucker, J. E.; Monolithically integrated laser/Mach-Zehnder modulators using quantum wells, Lasers and Electro-Optics Society Annual Meeting, 1993. LEOS '93 Conference Proceedings. IEEE, 15-18 Nov. 1993, Page(s): 641-642.

[2] Zucker, J. E.; Jones, K. L.; Newkirk, M. A.; Gnall, R. P.; Miller, B. I.; Young, M. G.; Koren, U.; Burrus, C. A.; Tell, B.; Quantum well interferometric modulator monolithically integrated with 1.55 μm tunable distributed Bragg reflector laser, Electronics Letters, Volume: 28 Issue: 20, 24 Sep. 1992, Page(s): 1888-1889.

[3] Rolland, C.; InGaAsP-based Mach-Zehnder modulators for high-speed transmission systems, Optical Fiber Communication Conference and Exhibit, 1998. OFC '98., Technical Digest, 22-27 Feb. 1998, Page(s): 283-284.

[4] Akulova, Y. A.; Fish, G. A.; Ping-Chiek Koh; Schow, C. L.; Kozodoy, P.; Dahl, A. P.; Nakagawa, S.; Larson, M. C.; Mack, M. P.; Strand, T. A.; Coldren, C. W.; Hegblom, E.; Penniman, S. K.; Wipiejewski, T.; Coldren, L. A.; Widely tunable electroabsorption-modulated sampled-grating DBR laser transmitter, Selected Topics in Quantum Electronics, IEEE Journal on, Volume: 8 Issue: 6, Nov.-Dec. 2002, Page (s): 1349-1357.

[5] U.S. Pat. No. 5,694,504, issued Dec. 2, 1997, to Yu et al., entitled Semiconductor modulator with a π shift.

[6] Yu, J.; Rolland, C.; Yevick, D.; Somani, A.; Bradshaw, S.; Phase-engineered III-V MQW Mach-Zehnder modulators, Photonics Technology Letters, IEEE, Volume: 8 Issue: 8, Aug. 1996, Page(s): 1018-1020.

[7] Penninckx, D.; Delansay, Ph.; Comparison of the propagation performance over standard dispersive fiber between InP-based π-phase-shifted and symmetrical Mach-Zehnder modulators, Photonics Technology Letters, IEEE, Volume: 9 Issue: 9, Sep. 1997, Page(s): 1250-1252.

[8] U.S. Pat. No. 5,778,113, issued Jul. 7, 1998, to Yu, and entitled Configurable chirp Mach-Zehnder optical modulator.

[9] Lovisa, S.; Bouche, N.; Helmers, H.; Heymes, Y.; Brillouet, F.; Gottesman, Y.; Rao, K.; Integrated laser Mach-Zehnder modulator on indium phosphide free of modulated-feedback, Photonics Technology Letters, IEEE, Volume: 13 Issue: 12, Dec. 2001, Page(s): 1295-1297.

[10] Xun Li; Huang, W.-P.; Adams, D. M.; Rolland, C.; Makino, T.; Modeling and design of a DFB laser integrated with a Mach-Zehnder modulator, Quantum Electronics, IEEE Journal of, Volume: 34 Issue: 10, Oct. 1998, Page(s): 1807-1815.

[11] Lawetz, C.; Cartledge, J. C.; Rolland, C.; Yu, J.; Modulation characteristics of semiconductor Mach-Zehnder optical modulators, Lightwave Technology, Journal of, Volume: 15 Issue: 4, Apr. 1997, Page(s): 697-703.

[12] Hoon Kim; Gnauck, A. H.; Chirp characteristics of dual-drive. Mach-Zehnder modulator with a finite DC extinction ratio, Photonics Technology Letters, IEEE, Volume: 14 Issue: 3, Mar. 2002, Page(s): 298-300.

[13] U.S. Pat. No. 5,303,079, issued Apr. 12, 1994, to Gnauck et al., and entitled Tunable chirp, lightwave modulator for dispersion compensation.

[14] U.S. Pat. No. 6,574,259, issued Jun. 3, 2003, to Fish et al., and entitled Method of making an opto-electronic laser with integrated modulator.

[15] Anderson, K.; Betty, I.; Indium Phosphide MZ chips are suited to long-reach metro, Laser Focus World, Volume: 39 Issue: 3, Mar. 2003, Page(s): 101-104.

[16] U.S. Pat. No. 6,334,005, issue Dec. 25, 2001, to Burie et al., and entitled Modulator of the Mach-Zehnder type having a very high extinction ratio.

[17] U.S. Pat. No. 5,652,807, issued Jul. 29, 1997, to Fukuchi, and entitled Semiconductor optical modulator.

[18] U.S. Pat. No. 6,587,604, issued Jul. 1, 2003, to Yamauchi, and entitled Optical semiconductor device.

[19] Muller, M.; Gollub, D.; Fischer, M.; Kamp, M.; Forchel, A.; 1.3-/spl mu/m continuously tunable distributed feedback laser with constant power output based on GaInNAs—GaAs, Photonics Technology Letters, IEEE, Volume: 15 Issue: 7, Jul. 2003, Page(s): 897-899.

[20] Reid, D. C. J.; Robbins, D. J.; Ward, A. J.; Whitbread, N. D.; Williams, P. J.; Busico, G.; Carter, A. C.; Wood, A. K.; Carr, N.; Asplin, J. C.; Kearley, M. Q.; Hunt, W. J.; Brambley, D. R.; Rawsthome, J. R.; A novel broadband DBR laser for DWDM networks with simplified quasi-digital wavelength selection, Optical Fiber Communication Conference and Exhibit, 2002. OFC 2002, 17-22 Mar. 2002, Page(s): 541-543.

[21] U.S. Pat. No. 6,516,017, issued Feb. 4, 2003, to Matsumoto, and entitled Multiwavelength semiconductor laser device with single modulator and drive method therefor.

[22] U.S. Pat. No. 4,896,325, issued Jan. 23, 1990, to Coldren, and entitled Multi-section tunable laser with differing multi-element mirrors.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A semiconductor optical transmitter, comprising:
a common substrate;

a tunable laser resonator, formed on the common substrate, for producing a light beam, such that the wavelength of the light beam is tunable over a wider wavelength range than is achievable by index tuning of the tunable laser resonator, wherein the wider wavelength range is represented by $\Delta\lambda/\lambda > \Delta n/n$, $\lambda$ represents the wavelength of the light beam, $\Delta\lambda$ represents the change in the wavelength of the light beam, n represents the index tuning of the laser, and $\Delta n$ represents the change in the index tuning of the laser;

a semiconductor Mach-Zehnder (MZ) modulator, formed on the common substrate and positioned external to the tunable laser resonator, wherein the MZ modulator includes first and second multimode interference (MMI) couplers, the first MMI coupler divides the light beam into first and second components that are directed by first and second optical waveguides to inputs of the second MMI coupler, the second MMI coupler combines the first and second components interferometrically, thereby directing the combined components to an output of the second MMI coupler, the first and second waveguides each include a first electrode for applying an electric field to modulate an optical path length of the waveguide, and at least one of the first and second waveguides includes a second electrode for applying a current to adjust a phase of the light beam; and one or more output couplers formed on the common substrate in the epitaxial structure, wherein at least one of the couplers is positioned and configured to receive the light beam output from the MZ modulator, reduce back reflections to the MZ modulator, and couple the light beam output from the MZ modulator to a following optical assembly.

2. The transmitter of claim 1, wherein the MZ modulator is formed on the common substrate in the same epitaxial structure as the tunable laser resonator.

3. The transmitter of claim 1, wherein the MZ modulator is formed on the common substrate in a different epitaxial structure from the tunable laser resonator.

4. The transmitter of claim 1, wherein the first MMI coupler divides the light beam into first and second components of equal magnitude.

5. The transmitter of claim 1, wherein the first MMI coupler divides the light beam into first and second components of unequal magnitude.

6. A semiconductor optical transmitter device, comprising:
a common substrate;
a widely-tunable laser, formed on the common substrate, for producing a light beam, wherein the wavelength of the light beam is tunable over a wider wavelength range than is achievable by index tuning of the tunable laser resonator; and
a modulator, formed on the common substrate, for modulating the light beam, wherein the modulator is positioned external to the laser along a common waveguide with the laser, and wherein the modulator includes a plurality of interferometric arms, each of the arms contains a first electrode for applying an electric field to modulate the light beam, and at least one of the arms contains a second electrode for applying a current to adjust a phase of the light beam, such that a chirp of the modulated light beam is dynamically controlled by the modulator over the wider wavelength tuning range of the laser.

7. The device of claim 6, wherein the laser is a widely-tunable sampled grating distributed Bragg reflector (SGDBR) laser.

8. The device of claim 6, wherein the wider wavelength range is represented by $\Delta\lambda/\lambda > \Delta n/n$, $\lambda$ represents the wavelength of the light beam, $\Delta\lambda$ represents the change in the wavelength of the light beam, n represents the index tuning of the laser, and $\Delta n$ represents the change in the index tuning of the laser.

9. The device of claim 6, wherein the modulator is a Mach-Zehnder (MZ) modulator.

10. The device of claim 6, wherein the modulator is formed on the common substrate in the same epitaxial structure as the laser.

11. The device of claim 6, wherein the modulator is formed on the common substrate in a different epitaxial structure from the laser.

12. The device of claim 6, wherein the first electrodes accept a modulation voltage to adjust a relative optical phase length of the arm at high speed through an electro-optic effect.

13. The device of claim 6, wherein the second electrodes permit a free selection of a differential phase shift between the arms with minimal attenuation.

14. The device of claim 6, wherein the modulator includes a first multimode interference (MMI) coupler that successively splits the light beam into separate paths for the arms and a second MMI coupler that constructively or destructively combines the light beam from the arms, depending on their modulated phase difference, into an output.

15. The device of claim 14, wherein the MMI couplers prevent reflection of the light beam back into the laser.

16. The device of claim 14, wherein the second MMI coupler has two outputs such that a residual reflectivity is the same when the light beam is directed toward either of the outputs, which ensures that the laser is not perturbed differently as the modulator switches the light beam between the paths under modulation.

17. The device of claim 6, further comprising one or more output couplers, formed on the common substrate, wherein at least one of the couplers is positioned and configured to receive the light beam output from the modulator, and couple the light beam output from the modulator to a following optical assembly.

18. The device of claim 17, wherein the output couplers transform a shape of an optical mode of the light beam at the output of the modulator.

19. The device of claim 17, wherein a first of the output couplers is directed to a facet of the device to output the light beam to the following optical assembly.

20. The device of claim 19, wherein a second of the output couplers is directed toward the facet of the device in such a manner that an angle between the light beam exiting from the first of the output couplers and the light beam exiting from the second of the output couplers are at an angle >20 degrees.

21. The device of claim 17, further comprising an electrode that monitors an optical power of the light beam output from the modulator, wherein the electrode is positioned to receive the light beam from one of the output couplers.

22. The device of claim 6, further comprising one or more additional short modulators, formed on the common substrate, positioned before or after the modulator, wherein the additional short modulators modify chirp properties of the modulator.

23. The device of claim 22, wherein the additional short modulators are Mach-Zehnder modulators.

24. The device of claim 22, wherein the additional short modulators include current-induced phase shifters.

25. The device of claim 6, further comprising a semiconductor optical amplifier (SOA), formed on the common substrate, positioned between the laser and the modulator, wherein the semiconductor optical amplifier amplifies the light beam produced by the laser.

26. A method for producing a light beam, comprising:
producing a light beam from a widely-tunable laser formed on a common substrate, wherein the wavelength of the light beam is tunable over a wider wavelength range than is achievable by index tuning of the tunable laser resonator; and
modulating the light beam in a modulator formed on the common substrate, wherein the modulator is positioned external to the laser along a common waveguide with the laser, and wherein the modulator includes a plurality of interferometric arms, by applying an electric field to a first electrode in contact with each of the arms to modulate the light beam, and simultaneously injecting currents into a second electrode in contact with at least one of the arms to adjust a phase of the light beam such that a chirp of the modulated light beam is dynamically controlled by the modulator over the wider wavelength tuning range of the laser.

27. The method of claim 26, wherein the laser is a widely-tunable sampled grating distributed Bragg reflector (SGDBR) laser.

28. The method of claim 26, wherein the wider wavelength range is represented by $\Delta\lambda/\lambda > n/n$, $\lambda$ represents the wavelength of the light beam, $\Delta\lambda$ represents the change in the wavelength of the light beam, n represents the index tuning of the laser, and $\Delta n$ represents the change in the index tuning of the laser.

29. The method of claim 26, wherein the modulator is a Mach-Zehnder (MZ) modulator.

30. The method of claim 26, wherein the modulator is formed on the common substrate in the same epitaxial structure as the laser.

31. The method of claim 26, wherein the modulator is formed on the common substrate in a different epitaxial structure from the laser.

32. The method of claim 26, wherein the first electrodes accept a modulation voltage to adjust a relative optical phase length of the arm at high speed through an electro-optic effect.

33. The method of claim 26, wherein the second electrodes permit a free selection of a differential phase shift between the arms with minimal attenuation.

34. The method of claim 26, wherein the modulator includes a first multimode interference (MMI) coupler that successively splits the light beam into separate paths for the arms and a second MMI coupler that constructively or destructively combines the light beam from the arms, depending on their modulated phase difference, into an output.

35. The method of claim 34, wherein the MMI couplers prevent reflection of the light beam back into the laser.

36. The method of claim 34, wherein the second MMI coupler has two outputs such that a residual reflectivity is the same when the light beam is directed toward either of the outputs, which ensures that the laser is not perturbed differently as the modulator switches the light beam between the paths under modulation.

37. The method of claim 26, wherein at least one output coupler, formed on the common substrate, is positioned and configured to receive the light beam output from the modulator, and couple the light beam output from the modulator to a following optical assembly.

38. The method of claim 37, wherein the output couplers transform a shape of an optical mode of the light beam at the output of the modulator.

39. The method of claim 37, wherein a first of the output couplers is directed to a facet to output the light beam to the following optical assembly.

40. The method of claim 39, wherein a second of the output couplers is directed toward the facet in such a manner that an angle between the light beam exiting from the first of the output couplers and the light beam exiting from the second of the output couplers are at an angle >20 degrees.

41. The method of claim 37, wherein an electrode monitors an optical power of the light beam output from the modulator, and the electrode is positioned to receive the light beam from one of the output couplers.

42. The method of claim 26, wherein one or more additional short modulators, formed on the common substrate, are positioned before or after the modulator, and the additional short modulators modify chirp properties of the modulator.

43. The method of claim 42, wherein the additional short modulators are Mach-Zehnder modulators.

44. The method of claim 42, wherein the additional short modulators include current-induced phase shifters.

45. The method of claim 26, wherein a semiconductor optical amplifier (SOA), formed on the common substrate, is positioned between the laser and the modulator, and the semiconductor optical amplifier amplifies the light beam produced by the laser.

46. The device of claim 21 wherein a second output coupler is directed toward a facet of the device at an angle greater than a critical angle to induce total internal reflection of the light beam to the electrode that monitors an optical power of the light beam output from the modulator.

47. The method of claim 41 wherein a second output coupler is directed toward a facet of the device at an angle greater than a critical angle to induce total internal reflection of the light beam to the electrode that monitors an optical power of the light beam output from the modulator.

* * * * *